United States Patent
Sydon et al.

(10) Patent No.: US 6,480,721 B1
(45) Date of Patent: Nov. 12, 2002

(54) METHOD AND SYSTEM FOR AVOIDING BAD FREQUENCY SUBSETS IN A FREQUENCY HOPPING CORDLESS TELEPHONE SYSTEM

(75) Inventors: Uwe Sydon; Juergen Kockmann; Olaf Dicker, all of Austin; Paulus Sastrodjojo, Round Rock, all of TX (US)

(73) Assignee: Siemens Information and Communication Mobile LLC, San Diego, CA (US)

(*) Notice: Subject to any disclaimer, the term of this patent is extended or adjusted under 35 U.S.C. 154(b) by 0 days.

(21) Appl. No.: 09/113,396

(22) Filed: Jul. 10, 1998

(51) Int. Cl.$^7$ ................................. H04Q 7/20
(52) U.S. Cl. .................... 455/464; 455/452; 455/450
(58) Field of Search ................. 455/464, 450, 455/452, 67.3, 74.1, 575, 62, 63, 67.1; 370/329, 330, 341, 95.1, 333, 252, 465, 468; 379/59; 375/132; 714/704–706

(56) References Cited

U.S. PATENT DOCUMENTS

| | | | | |
|---|---|---|---|---|
| 3,681,694 A | * | 8/1972 | Sarati ............................ 325/2 |
| 4,736,453 A | | 4/1988 | Schloemer ..................... 455/33 |
| 5,044,010 A | * | 8/1991 | Frenkiel et al. ................ 379/61 |
| 5,138,616 A | * | 8/1992 | Wagner, Jr. et al. ......... 371/5.1 |
| 5,148,548 A | * | 9/1992 | Meche et al. ............... 455/34.1 |
| 5,197,093 A | * | 3/1993 | Knuth et al. ................... 379/61 |
| 5,323,447 A | * | 6/1994 | Grillis et al. .................. 379/61 |
| 5,412,658 A | | 5/1995 | Arnold et al. ............. 370/69.1 |
| 5,475,868 A | * | 12/1995 | Duque-Anton et al. ........ 455/62 |
| 5,541,954 A | | 7/1996 | Emi ............................ 375/202 |
| 5,581,555 A | * | 12/1996 | Dubberly et al. ........... 370/487 |
| 5,671,219 A | | 9/1997 | Jensen et al. ................ 370/280 |
| 5,761,621 A | | 6/1998 | Sainton ...................... 455/453 |
| 5,793,795 A | * | 8/1998 | Li ............................... 375/200 |
| 5,848,095 A | * | 12/1998 | Deutsch ....................... 375/202 |

(List continued on next page.)

FOREIGN PATENT DOCUMENTS

| | | | | |
|---|---|---|---|---|
| DE | 19931369 A1 | * | 7/1999 | ............ H04B/7/204 |
| GB | 2 261 141 A | | 5/1993 | ............ H04K/1/00 |

OTHER PUBLICATIONS

Siemens publication by Vedat Bilgutay and David Leach entitled *A Dissertation on Mobility Markets and In–Building Wireless Telephone Requirements*, located on the Internet at http://www.siemenscom.com/products/wpapers/mobility.htm.

(List continued on next page.)

*Primary Examiner*—Daniel Hunter
*Assistant Examiner*—Charles Chow

(57) ABSTRACT

A method and system are disclosed for avoiding bad frequency subsets in a frequency hopping cordless telephone system. A base station communicates with the handsets using frequencies selected from active frequency subsets. Bad frequency subsets are avoided by monitoring the air interface between the base station and handsets for errors in active frequency subsets. Errors in each active frequency subset are counted during a short-term interval using an associated short-term error counter and during a long-term interval using an associated long-term error counter. After each short-term interval, it is evaluated whether any of the short-term error counters has a value that is greater than a defined threshold. After each long-term interval, it is evaluated whether any of the long-term error counters has a value greater than an error count for a blocked frequency subset. A blocked frequency subset is then substituted for an active frequency subset if an associated short-term error counter is greater than the defined threshold or if a long-term error counter is greater than the error count for a blocked frequency subset.

24 Claims, 2 Drawing Sheets

U.S. PATENT DOCUMENTS

| | | | | |
|---|---|---|---|---|
| 5,857,143 A | | 1/1999 | Kataoka | 455/62 |
| 5,982,760 A | | 11/1999 | Chen | 370/335 |
| 5,987,033 A | * | 11/1999 | Boer et al. | 370/445 |
| 5,999,816 A | | 12/1999 | Tiedemann, Jr. et al. | 455/437 |
| 6,009,332 A | | 12/1999 | Haartsen | 455/450 |
| 6,021,123 A | | 2/2000 | Mimura | 370/331 |
| 6,023,459 A | * | 2/2000 | Clark et al. | 370/329 |
| 6,023,462 A | * | 2/2000 | Nieczyporowicz et al. | 370/335 |
| 6,023,621 A | | 2/2000 | Jackson et al. | 455/442 |
| 6,115,407 A | * | 9/2000 | Gendel et al. | 375/132 |

OTHER PUBLICATIONS

Siemens publication entitled *Siemens Reports Solid Growth*, located on the Internet at http://www.siemenscom.com/news/pr/960315b.htm.

Siemends AG PN Applications/Solutions Cordless Systems located on the Internet at http://w3.siemens.de/pn/an/cordless/clfunk.htm.

DECT by Erricsson located on the Internet at http://www.ericsson.com/BN/dect9.html.

* cited by examiner

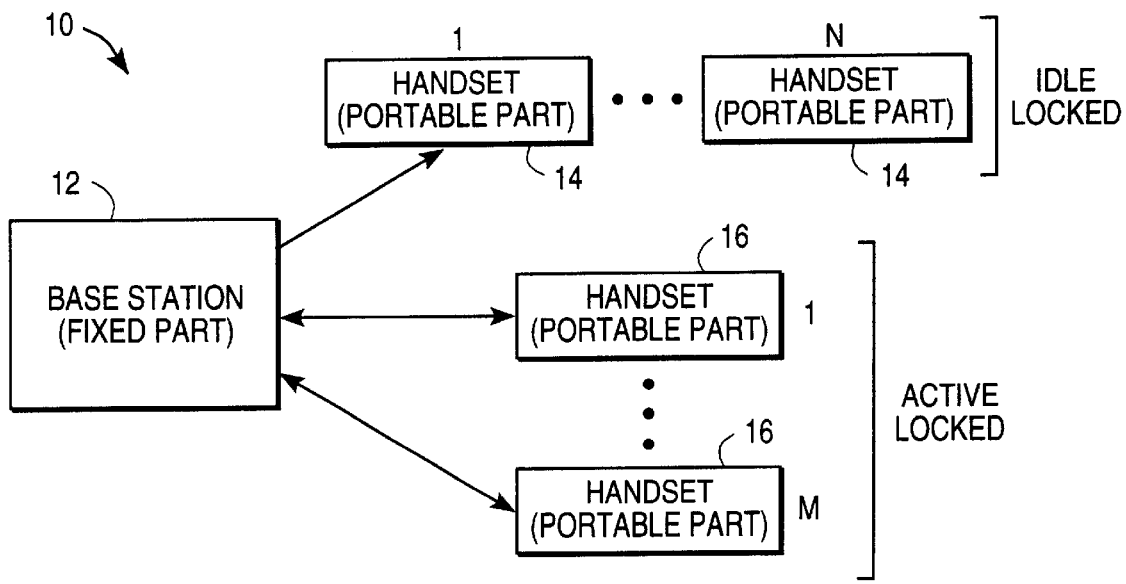
FIG. 1
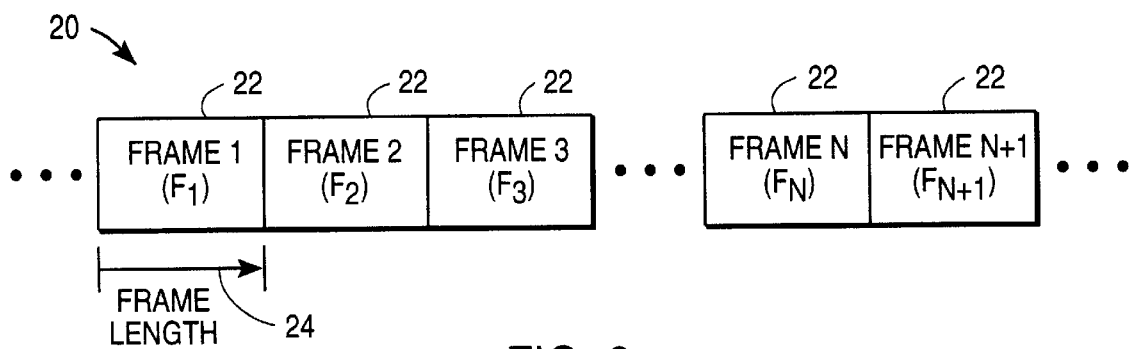
FIG. 2
| SUBSET | 0 | 1 | 2 | 3 | 4 | 5 | 6 | 7 | 8 | 9 | 10 | 11 |
|---|---|---|---|---|---|---|---|---|---|---|---|---|
| CHANNEL | 0...7 | 0...7 | 0...7 | 0...7 | 0...7 | 0...7 | 0...7 | 0...7 | 0...7 | 0...7 | 0...7 | 0...7 |
| FREQUENCY | 0...7 | 8...15 | 16... | | | | | | | | | ...95 |
2.4 GHz — 2.4835 GHz
FIG. 3

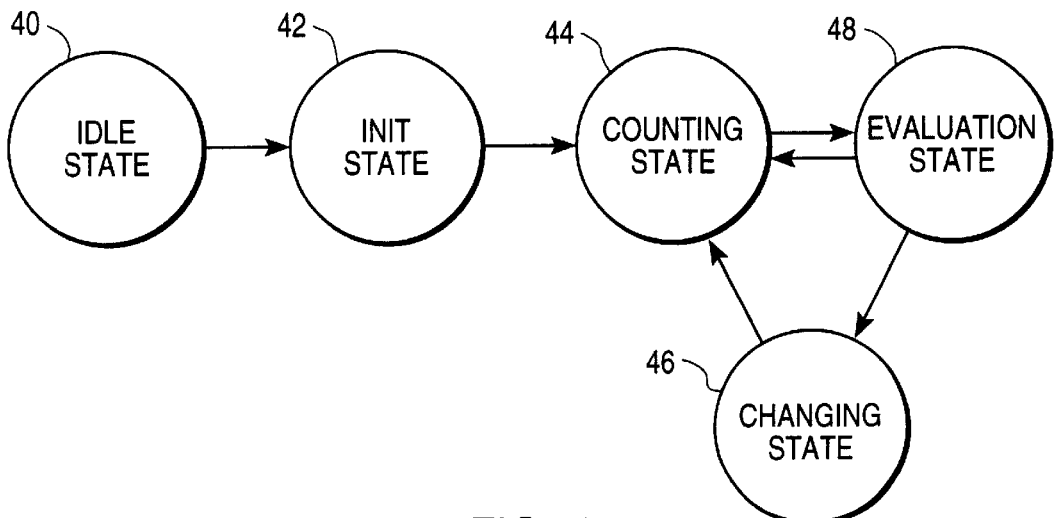
FIG. 4
| HOP NUMBER | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
|---|---|---|---|---|---|---|---|---|---|---|---|---|---|---|---|---|---|---|---|---|---|---|---|---|---|---|---|---|
| 10 SUBSET HOP | | 2 | 3 | 4 | 5 | 6 | 7 | 8 | 9 | 10 | | 2 | 3 | 4 | 5 | 6 | 7 | 8 | 9 | 10 | | 2 | 3 | 4 | 5 | 6 | 7 | 8 |
| 11 SUBSET HOP | | 2 | 3 | 4 | 5 | 6 | 7 | 8 | 9 | 10 | 11 | | 2 | 3 | 4 | 5 | 6 | 7 | 8 | 9 | 10 | 11 | | 2 | 3 | 4 | 5 | 6 |
⇨ SHIFTING OF 1 SUBSET NUMBER / 10 HOPS ⇨
FIG. 5
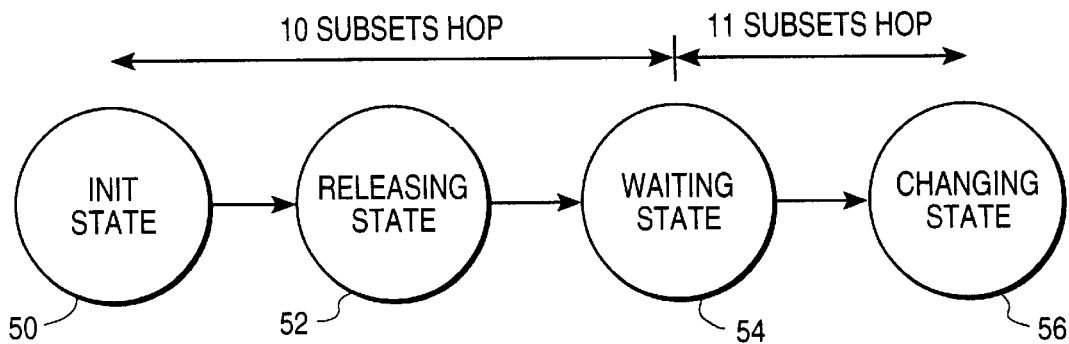
FIG. 6

METHOD AND SYSTEM FOR AVOIDING BAD FREQUENCY SUBSETS IN A FREQUENCY HOPPING CORDLESS TELEPHONE SYSTEM

This application is related to U.S. patent application Ser. No. 09/113,539, filed Jul. 10, 1998, entitled "Method and System for Table Implemented Frequency Selection in a Frequency Hopping Cordless Telephone System", pending, and U.S. patent application Ser. No. 09/113,415, filed Jul. 10,1998, entitled "Method and System for Shifting Frequency Subsets to Avoid Base Station Interference in a Frequency Hopping Cordless Telephone System", pending, the disclosures of which are incorporated herein by reference.

TECHNICAL FIELD OF THE INVENTION

The present invention relates in general to the field of cordless communication systems and, more particularly, to a method and system for avoiding bad frequency subsets in a frequency hopping cordless telephone system.

BACKGROUND OF THE INVENTION

Cordless or wireless communications systems are widely used to provide users with mobile communications. In general, the term cordless can refer to any form of air wave transmission using a set of radio frequencies. Conventional implementations of cordless systems, for example, include both public cordless systems and in-building cordless systems. In public systems, there are numerous service providers that allow users to make and receive calls virtually anywhere within a service area Such service providers offer solutions based on a number of different technologies and standards. Typically, the service providers have purchased a license from the federal government (i.e., Federal Communications Commission) to use a specific portion of the radio spectrum within specific markets.

In contrast to public systems, in-building cordless systems can avoid the costs of radio spectrum licenses by using unlicensed radio frequencies. In-building systems typically have a common configuration or topography in that there is a radio exchange that is adjunct to or integrated with a private branch exchange (PBX). Base stations (or fixed parts) are equipped with radio antennas that connect to the radio exchange. The base stations also transmit radio signals to and receive radio signals from cordless handsets (portable parts) within a limited range.

With respect to unlicensed radio frequencies, cordless systems often use the ISM (Industrial, Scientific and Medical) band. In the United States, ISM based devices are regulated by and must follow Federal Communications Commission (FCC) guidelines. In general, FCC guidelines implement restrictions on the use of frequencies within the ISM band. For example, devices are allowed to communicate at a particular frequency only with a defined bandwidth for a defined period of time and with a defined signal power level. Since the ISM band is unlicensed, it is used by many vendors for various types of cordless devices (e.g., medical monitoring devices, wireless LANs, printers, speakers, security systems and in-building cordless systems). Consequently, radio frequency (RF) interference can be a significant problem with using the ISM band.

For a cordless telephone system using the ISM band, the FCC restrictions produce a need to implement a frequency hopping scheme to ensure that the cordless system does not violate restrictions on the use of frequencies within the ISM band. Frequency hopping can achieve this by allowing base stations and handsets to move in sync from frequency to frequency in the time domain. Further, when implementing such a frequency hopping scheme, there is a need to implement a scheme for avoiding bad channels or frequencies due to RF interference and other problems.

SUMMARY OF THE INVENTION

In accordance with the present invention, a method and system for avoiding bad frequencies in a frequency hopping cordless telephone system are disclosed that provide advantages over conventional cordless telephone systems.

According to one aspect of the present invention, a base station communicates with handsets using frequencies selected from active frequency subsets. Bad frequency subsets are avoided by monitoring the air interface between the base station and handsets for errors in active frequency subsets. Errors in each active frequency subset are counted during a short-term interval using an associated short-term error counter and during a long-term interval using an associated long-term error counter. After each short-term interval, it is evaluated whether any of the short-term error counters has a value that is greater than a defined threshold. After each long-term interval, it is evaluated whether any of the long-term error counters has a value greater than the error count for a blocked frequency subset. A blocked frequency subset is then substituted for an active frequency subset if an associated short-term error counter is greater than the defined threshold or if a long-term error counter is greater than the error count for a blocked frequency subset.

A technical advantage of the present invention s the ability automatically to block bad frequency subsets and to adapt to changing interference by substituting blocked subsets for active frequency subsets.

Other technical advantages should be apparent to one of ordinary skill in the art in view of the specification, drawings and claims.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein:

FIG. 1 is a block diagram of one embodiment of a frequency hopping cordless telephone system;

FIG. 2 is a block diagram of one embodiment of frame frequencies for a frequency hopping cordless telephone system;

FIG. 3 is a diagram of one embodiment of subdividing the ISM band for a frequency hopping cordless telephone system;

FIG. 4 is a state diagram of one embodiment of a method for avoiding bad frequency subsets in a frequency hopping cordless telephone system;

FIG. 5 is a diagram of one embodiment of shifting frequencies to avoid base station interference in a frequency hopping cordless telephone system; and FIG. 6 is a state diagram of one embodiment of a method for shifting frequencies to avoid base station interference in a frequency hopping cordless telephone system.

DETAILED DESCRIPTION OF THE INVENTION

FIG. 1 is a block diagram of one embodiment of a frequency hopping cordless telephone system, indicated generally at 10. System 10 comprises one or more base stations 12, each which can also be referred to as a fixed part (FP). Each base station 12 can support communication with a plurality of handsets 14 and handsets 16 using radio frequencies. The interface between base station 12 and handsets 14 and 16 can be referred to as the air interface. Handsets 14 and handsets 16 car. also be referred to as portable parts (PP).

In operation, base station 12 can support a defined total number of handsets 14 and 16. For example, in one implementation, base station 12 can support a total of eight handsets, either idle locked or active locked. Of the total number of handsets, a given number "M" can be active locked handsets 16. For example, base station 12 could support up to four active locked handsets 16 from the eight total handsets. Of the remaining handsets, base station 12 can support a given number "N" of idle locked handsets 14. For example, "N" can be less than or equal to the difference between the total number of supported handsets (e.g., 8) and the number "M" of active locked handsets 16 (e.g., 0–4). Idle locked handsets 14 are handsets that are currently inactive but are in contact with and in sync with base station 12.

Base station 12 can communicate with handsets 14 and handsets 16 using a time division multiplexed (TDM) frame-based communication protocol. For example, each frame can be ten milliseconds (10 ms) in duration and can include transmit and receive channels for communication and control data. One protocol used with digital cordless telephone systems is the Digital Enhanced Cordless Telecommunications (DECT) protocol, which is the pan-European standard for digital cordless systems and supports up to six locked handsets 16 (i.e., M=6). There are, of course, other protocols used for communicating across the air interface between base station 12 and handsets 14 and handsets 16. For example, the DECT protocol can be modified to support up to four locked handsets 16 (i.e., M=4) each with enhanced communication features due to higher data rates.

In the embodiment of FIG. 1, system 10 uses an ISM band of radio frequencies for supporting communication between base station 12 and handsets 14 and 16. For example, system 10 can use the ISM band extending from 2.4 GHz to 2.4835 GHz. An advantage of using the ISM band is that it is unlicensed and does not require a license fee for use. However, in order to operate within FCC or other government regulations, system 10 implements a frequency hopping scheme. This allows system 10 to support robust cordless communications in the ISM band while operating within regulation guidelines. Under the frequency hopping scheme, base station 12 and handsets 14 and 16 move in the time domain from frequency to frequency. Because of the changing frequency, handsets 14 and 16 are initially in an unlocked stare when entering an area serviced by base station 12. Handsets 14 and 16 can then "listen" at a specific radio frequency to attempt to lock on to base station 12. When base station 12 hops to that frequency specific frequency, handsets 14 and 16 can identify and receive control data transmitted by base station 12. This allows handsets 14 and 16 to lock with base station 12 and sync with the frequency hopping scheme.

FIG. 2 is a block diagram of one embodiment of frame frequencies for a frequency hopping cordless telephone system. As shown, a frame structure, indicated generally at 20, comprises a plurality of frames 22 each having a frame length 24. Each frame 22 follows immediately after the previous frame 22 in the time domain. In the embodiment of FIG. 2, a different frequency ($F_1, F_2, F_3 \ldots F_N, Fe_{n+1}, \ldots$) is associated with each frame 22 and is used during that frame 22 for communication across the air interface between base station 12 and handsets 14 and 16. This change from frequency to frequency is handled by the frequency hopping scheme implemented by base station 12 and handsets 14 and 16. During the duration of a given frame 22, base station 12 and handsets 14 and 16 communicate using the selected frequency for that frame 22. When the next frame 22 begins, base station 12 and handsets 14 and 16 communicate using a new selected frequency. In one embodiment, frame length 24 is ten milliseconds, thus the frequency being used changes every ten milliseconds.

FIG. 3 is a diagram of one embodiment of subdividing the ISM band for a frequency hopping cordless telephone system. The ISM band used in this embodiment extends from 2.4 GHz to 2.4835 GHz. As mentioned, the FCC defines requirements for use of frequencies within the ISM band. For example, within a 30 second period, the regulations limit the maximum length of time that a system can use one frequency to 0.4 seconds. Thus, the total available frequencies needs to include seventy-five or more frequencies. In the embodiment of FIG. 3, this range is divided into twelve subsets 30, and each subset 30 is divided into eight channels 32. Each channel 32 is hen associated with one of ninety-six frequencies 34 defined within and equally subdividing the ISM band. Frequencies 34 then provide a set of frequencies from which the frequency hopping scheme can select for each frame 22.

The frequency hopping scheme, in addition to selecting frequencies, also needs to implement a scheme for avoiding bad frequency subsets. For example, a PCS microwave tower may interfere with frequencies in the ISM band in a particular region. Thus, cordless telephone system 10 would not want to use those frequencies. One way to avoid such bad frequency subsets is to block their selection. By dividing the ISM band into ninety-six frequencies, the embodiment of FIG. 3 provides sufficient frequencies to allow bad frequencies to be blocked while keeping the number of available frequencies above the seventy-five frequency threshold. For example, there is freedom to avoid using the frequencies within two subsets 30 without dropping below the seventy-five frequency threshold.

Within a cordless telephone system, a frequency hopping scheme can address a number of implementation problems. For example, the frequency hopping scheme should be consistent across base stations yet attempt to ensure that adjacent base stations do not select the same frequencies and interfere with one another. This means that the frequency selection process needs to be both predictable (so handsets can lock with any base station, and variable (so base stations operate at different frequencies). Also, the frequency hopping scheme should attempt to avoid selecting and using bad frequency subsets due to interference or other problems. Further, the frequency hopping scheme should react to interference by separating the frequencies selected by a base station from possible interference by other base stations.

FIG. 4 is a state diagram of one embodiment of a method for avoiding bad frequency subsets in a frequency hopping cordless telephone system. The method of FIG. 4 can be implemented by a base station to enhance selection of frequencies for the air interface quality by avoiding bad frequency subsets. As mentioned above with respect to FIG. 3, one embodiment of a frequency hopping cordless telephone system defines twelve different subsets for grouping channels within the ISM band. The method of FIG. 4 operates to select for use the current best ten out of the twelve available subsets and to block the remaining two subsets. Thus, in this embodiment, the system uses ten subsets, except during subset substitution as is described below with respect to FIGS. 5 and 6.

In general, the method of FIG. 4 involves a number of steps in the selection of which subsets to block and uses two error counters associates with each subset. The first error counters for each subset are compared and cleared every second. The second error counters are checked and reset every five seconds. Consequently, the first error counters can be referred to as the short-term error counters, and the second error counters can be referred to as the long-term error counters in this embodiment, both the short-term and long-term error counters are incremented if any of he following conditions are met: (a) bad packet data, indicated by a bad synchronization word; or (b) bad cyclic redundancy code (CRC). Substitution of currently blocked subset for a currently active subset is then performed if either of the following conditions are met: (a) in a one second period any of the short-term error counters for an active subset has a count that is greater than nine; or (b) in a five second period any of the long-term error counters for an active subset has a count greater than the count for one of the blocked subsets. Further, in this scheme, every five seconds the error count for each of the blocked subsets is reduced by 2.5%. This reduction is repeated up to six times until the error count is equal to 85% of the original value (i.e., 100%−6×2.5%= 85%).

Specifically, the embodiment of FIG. 4 implements the method using a state machine having five states. Initially, the method is in an idle state 40 in which the method for avoiding bad frequency subsets is inactive. When frequency selection is initiated, the method then moves to an init state 42. in init state 42. the short-term and long-term error counters and data relating to blocked subsets are initialized. Each short-term counter can be an eight bit counter that is cleared every second, while each long-term counter can be a sixteen bit counter that is cleared every five seconds, As mentioned, there is a pair of counters associated with each subset. The data relating to the blocked subsets stores information about each of the blocked subsets and the error count. This data can be updated when there is a new subset to be blocked. Init state 42 is used once, and the method moves to a counting state 44.

There are two components to counting state 44. The first is the monitoring of the air interface quality for errors in active subsets, and the second is the timing of one and five second intervals for counting errors in active subsets. The third component is an evaluation whether any of the short-term error counters is greater than a defined threshold (e.g. a count of nine). The method moves directly to a changing state 46 if any of the short-term error counters is greater than the threshold, otherwise the method remains in counting state 44 until five seconds have passed. At the end of five seconds, the method moves to an evaluation state 48 and evaluates whether there is a blocked subset to be substituted for an active subset based upon the long-term error counters. In evaluation state 48, the long-term error counters are compared. If the count for an active subset is greater than that for a blocked subset, then the data relating to blocked subsets is updated to reflect a substitution, and the method moves to changing state 46.

In changing state 46, a blocked subset is made active and an active subset is blocked. The active subset to be blocked is either one that had a short-term error count greater than the threshold (from counting state 44) or one that had a long-term error count greater than one of the blocked subsets (from evaluation state 48). Changing state 46 results in the substitution of the blocked subset for the active subset and returns to counting state 44. This substitution process needs to be seamless to avoid loss of synchronization. Further, during the substitution process, a scheme can be implemented for shifting frequencies to avoid base station interference.

FIG. 5 is a diagram of one embodiment of shifting frequencies to avoid base station interference in a frequency hopping cordless telephone system. Because base stations within a cordless telephone system are likely to implement the same frequency hopping and bad frequency avoidance schemes, collisions can occur and persist. The subset or frequency shifting of FIG. 5 avoids these collisions which can occur when two or more base stations use the same channel at the same time. As mentioned above, in one embodiment, the base station's frequency hopping scheme cycles through ten active subsets before repeating a subset. The subset or frequency shifting is implemented by having the system cycle through eleven subsets instead of ten for a certain time when a collision occurs.

As shown in FIG. 5, the base station being shifted can implement one additional hop after the normal ten hops. As a result, the shifted system breaks the period of the use of the subset. For example, without shifting, Subset 1 would appear at hop numbers 1, 11, 21 and so on. With shifting using an additional subset hop, Subset 1 is shifted to hop numbers 12, 23 and so on. Thus, in this scheme, Subset 1 is shifted with a rate of 1/10. As should be clear, using eleven subsets for five cycles would shift Subset 1 to fall in the middle of the position it would otherwise occupy. This can be considered to be an optimal shift to avoid base station interference.

This subset shifting can be implemented as part of the above method for avoiding bad frequency subsets. In particular, subset shifting can be integrated as part of subset substitution in the changing state. Thus, both the newly active blocked subset and the to-be-blocked active subset can be used for a defined period of time to increase the number of subset hops and accomplish subset shifting.

FIG. 6 is a state diagram of one embodiment of a method for this shifting of frequencies to avoid base station interference in a frequency hopping cordless telephone system. In this embodiment, subset shifting is implemented as part of the subset substitution of the method of FIG. 4. As shown an FIG. 6, subset shifting can be implemented by a state machine having an init state 50, a releasing state 52, a waiting state 54 and a changing state 56.

During waiting state 54, the system hops using eleven subsets, and subset shifting is taking place. In this process, information relating to blocked subsets can be stored (e.g., as a variable), and the base station can broadcast the information to the handsets. The handsets need to receive this broad cast information before the system hops to the subset that is related to the information. This is applied for both reusing a blocked subset as well as blocking the active subset. During init state 50, the method determines the subset number where the subset blocking information is updated. An algorithm is implemented such that the subset blocking information is updated while the subset following the blocked subset to be released is used. For example, Subset 10 might be a blocked subset that will be released. Assuming the hop sequence is 8, 9, 10, 11 and so on, then the system waits until Subset 11 before removing the information about Subset 10 from the subset blocking information. After init state 50, the method moves to releasing state 52.

In releasing state 52, the method waits until the subset blocking information can be updated. After the blocked subset is released, the method moves to waiting state 54, and the system hops with eleven subsets. A counter can then be initialized to allow the use of the eleven subsets for a defined period of time (e.g., fifty hops) within waiting state 54. As soon as the system completes the defined period of time hopping with eleven subsets, then the active subset to-be-blocked is blocked, in changing state 56, by updating the subset blocking information. This method of releasing can also be implemented to maintain synchronization. As should be understood, after the defined period of time (e.g., fifty hops) with eleven subsets, the subsets have been shifted (e.g., by five subsets) from the position they would otherwise occupy. As also should be understood, other implementations can use different numbers of active subsets and hops during the defined shifting period.

Although the present invention has been described in detail, it should be understood that various changes, substitutions and alterations can be made thereto without departing from the spirit and scope of the invention as defined by the appended claims.

What is claimed is:

1. A system for avoiding bad frequency subsets in a frequency hopping cordless telephone system, the system comprising:
    a plurality of handsets; and
    a base station communicating with the handsets using frequencies selected from active frequency subsets, the base station avoiding bad frequency subsets by:
        monitoring an air interface between the base station and the handsets for errors in active frequency subsets;
        counting errors in each active frequency subset during a short-term interval using an associated short-term error counter and during a long-term interval using an associated long-term error counter;
        evaluating, after each short-term interval, whether any of the short-term error counters has a value that is greater than a defined threshold;
        evaluating, after each long-term interval, whether any of the long-term error counters has a value greater than an error count for a blocked frequency subset; and
        substituting a blocked frequency subset for an active frequency subset if an associated short-term error counter is greater than the defined threshold or if a long-term error counter is greater than the error count for a blocked frequency subset.

2. The system of claim 1, wherein the base station can initialize the short-term error counters, the long-term error counters and data relating to blocked frequency subsets and associated error counts.

3. The system of claim 1, wherein counting errors comprises incrementing the short-term error counters and the long-term error counters based upon bad packet data, indicated by a bad synchronization word, and based upon bad cyclic redundancy checks.

4. The system of claim 1, wherein the short-term interval is one second, and the long-term interval is five seconds.

5. The system of claim 4, wherein each short-term counter is an eight bit counter that is cleared every second, while each long-term counter is a sixteen bit counter that is cleared every five seconds.

6. The system of claim 5, wherein substituting is accomplished by updating the data storing information about the blocked frequency subsets to reflect a substitution.

7. The system of claim 1, wherein evaluating whether any of the long-term error counters has a value greater than the error count for a blocked frequency subset comprises reducing the error count for a blocked frequency subset after each long-term interval for a defined number of long-term intervals.

8. The system of claim 1, wherein there are twelve frequency subsets of which ten are active and two are blocked.

9. The system of claim 8, wherein the twelve frequency subsets each comprise eight frequencies from a frequency band divided into ninety-six frequencies.

10. The system of claim 9, wherein the frequency band is an ISM band from 2.4 GHz to 2.4835 GHz.

11. A method for avoiding bad frequency subsets in a frequency hopping cordless telephone system, the method comprising:
    monitoring an air interface between a base station and handsets for errors in active frequency subsets;
    counting errors in each active frequency subset during a short-term interval using an associated short-term error counter and during a long-term interval using an associated long-term error counter;
    evaluating, after each short-term interval, whether any of the short-term error counters has a value that is greater than a defined threshold;
    evaluating, after each long-term interval, whether any of the long-term error counters has a value greater than an error count for a blocked frequency subset; and
    substituting a blocked frequency subset for an active frequency subset if an associated short-term error counter is greater than the defined threshold or if a long-term error counter is greater than the error count for a blocked frequency subset.

12. The method of claim 11, further comprising initializing the short-term error counters, the long-term error counters and data relating to blocked frequency subsets and associated error counts.

13. The method of claim 11, wherein counting errors comprises incrementing the short-term error counters and the long-term error counters based upon bad packet data, indicated by a bad synchronization word, and based upon bad cyclic redundancy checks.

14. The method of claim 11, wherein the short-term interval is one second, and the long-term interval is five seconds.

15. The method of claim 14, wherein each short-term counter is an eight bit counter that is cleared every second, while each long-term counter is a sixteen bit counter that is cleared every five seconds.

16. The method of claim 11, wherein substituting is accomplished by updating the data storing information about the blocked frequency subsets to reflect a substitution.

17. The method of claim 11, wherein evaluating whether any of the long-term error counters has a value greater than the error count for a blocked frequency subset comprises reducing the error count for a blocked frequency subset after each long-term interval for a defined number of long-term intervals.

18. The method of claim 11, wherein there are twelve frequency subsets of which ten are active and two are blocked.

19. The method of claim 18, wherein the twelve frequency subsets each comprise eight frequencies from a frequency band divided into ninety-six frequencies.

20. The method of claim 19, wherein the frequency band is an ISM band from 2.4 GHz to 2.4835 GHz.

21. The system of claim 1, wherein a blocked frequency subset has previously been an active frequency subset.

22. The system of claim 1, wherein substituting a blocked frequency subset for an active frequency subset comprises using both the blocked frequency subset and the active frequency subset for frequency hopping for a defined period before completing the substitution.

23. The method of claim 11, wherein a blocked frequency subset has previously been an active frequency subset.

24. The method of claim 11, wherein substituting a blocked frequency subset for an active frequency subset comprises using both the blocked frequency subset and the active frequency subset for frequency hopping for a defined period before completing the substitution.

* * * * *